United States Patent [19]
Hosono et al.

[11] Patent Number: 5,676,038
[45] Date of Patent: Oct. 14, 1997

[54] ACTUATOR WITH SLIDE TABLE

[75] Inventors: Masayuki Hosono; Hiroshi Miyachi; Toshio Satou, all of Ibaraki-ken, Japan

[73] Assignee: SMC Kabushiki Kaisha, Tokyo, Japan

[21] Appl. No.: 749,553

[22] Filed: Nov. 15, 1996

Related U.S. Application Data

[63] Continuation of Ser. No. 315,320, Sep. 30, 1994, abandoned.

[30] Foreign Application Priority Data

| Oct. 12, 1993 | [JP] | Japan | 5-254576 |
| Oct. 12, 1993 | [JP] | Japan | 5-280123 |
| May 10, 1994 | [JP] | Japan | 6-096638 |
| Jun. 16, 1994 | [JP] | Japan | 6-134130 |

[51] Int. Cl.$^6$ ............................................. F16P 15/18
[52] U.S. Cl. .............. 92/165 PR; 92/146; 92/161; 92/165 R
[58] Field of Search ............... 92/146, 161, 165 R, 92/165 PR; 384/45, 49

[56] References Cited

U.S. PATENT DOCUMENTS

| 1,959,098 | 5/1934 | Frimand | 92/165 PR |
| 2,444,664 | 7/1948 | Munschauer | 92/165 R |
| 3,008,774 | 11/1961 | Morris et al. | 384/45 |
| 3,439,581 | 4/1969 | Wilkins . | |
| 4,406,215 | 9/1983 | Lacasse | 92/165 PR |
| 4,406,502 | 9/1983 | Teramachi | 384/45 |
| 4,576,420 | 3/1986 | Lehmann et al. | 384/45 |
| 4,796,516 | 1/1989 | Horvath | 384/49 |
| 4,960,037 | 10/1990 | Granbom | 92/165 R |
| 5,363,741 | 11/1994 | Takada et al. . | |

FOREIGN PATENT DOCUMENTS

| 62-185905 | 11/1987 | Japan . |
| 1-63817 | 4/1989 | Japan . |
| 2-31902 | 2/1990 | Japan . |

Primary Examiner—F. Daniel Lopez
Attorney, Agent, or Firm—Oblon, Spivak, McClelland, Maier & Neustadt, P.C.

[57] ABSTRACT

Piston rods are coupled to respective pistons movably disposed respective cylinder chambers defined in a cylinder body. The piston rods have distal ends connected to an end plate mounted on a slide table which is mounted for movement along a guide rail. When the piston rods are displaced by the pistons, the slide table is also displaced axially of the cylinder body. When the slide table is positioned at either end of its stroke, a load is applied by the weight of a workpiece supported on the slide table and the weight of the slide table itself to the cylinder body through the guide rail. The slide table is thus prevented from being unduly flexed under the load. The length of the slide table can be set to a desired length irrespective of an increase in the displacement of the slide table. Even if the displacement of the slide table is increased, the slide table is not flexed and hence remains highly rigid against flexure.

7 Claims, 11 Drawing Sheets

ACTUATOR WITH SLIDE TABLE

This application is a Continuation of application Ser. No. 08/315,360, filed on Sep. 30, 1994, now abandoned.

BACKGROUND OF THE INVENTION

1. Field of the Invention

The present invention relates to an actuator operable for smoothly displacing a slide table through linear guide mechanisms.

2. Description of the Related Art

Actuators with slide tables coupled thereto often find use in an application for feeding a workpiece from one position to another.

Various actuators with slide tables have been proposed in the art as disclosed in Japanese laid-open utility model publications Nos. 2-31902 and 62-185905, for example.

According to Japanese laid-open utility model publication No. 2-31902, a piston rod is displaced when a cylinder in an actuator body is moved. A slide table having a substantially L-shaped cross section has one end held on a distal end of the piston rod, and a linear guide mechanism is disposed between the actuator body and the slide table.

According to Japanese laid-open utility model publication No. 62-185905, a pair of brackets on opposite ends of an actuator body is coupled to two piston rods, and a slide table which functions virtually as a cylinder body is disposed on an upper surface of the actuator body. The slide table is reciprocally movable along the actuator rods between the brackets.

The actuator with the slide table has a linear guide mechanism including balls rollingly movable between a guide rail and the slide table which is displaceable along the guide rail for thereby smoothly displacing the slide table.

Japanese laid-open utility model publication No. 1-63817 discloses a linear guide mechanism comprising a guide rail having a ball rolling groove, a guide block having a ball rolling groove confronting the ball rolling groove of the guide rail and a through hole parallel to the ball rolling groove for passage of balls therethrough, an end cap having a semiannular ball circulation path and joined to an end of the guide block, a plurality of balls rollingly inserted in the ball rolling grooves, and a retainer for retaining the balls.

Figure 1:
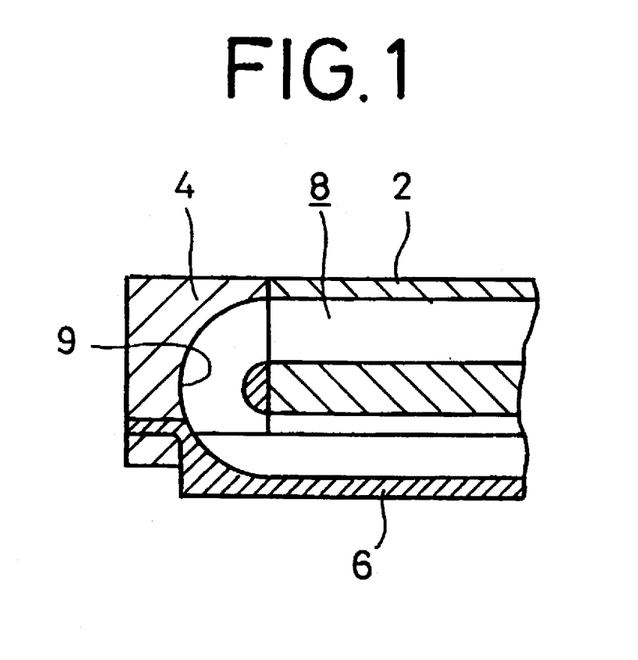
FIG. 1 is a fragmentary horizontal cross-sectional view of a conventional linear guide mechanism.

Specifically, as shown in FIG. 1 of the accompanying drawings, the disclosed linear guide mechanism has a guide block 2, an end cap 4 joined to an end of the guide block 2, and a retainer 6 inserted in an hole defined in the end cap 6. The guide block 2, the end cap 4, and the retainer 6 jointly define a ball circulation path 8.

With the actuator disclosed in Japanese laid-open utility model publication No. 2-31902, when the displacement of the slide table which supports a workpiece thereon is increased, since the end of the slide table is held on the distal end of the piston rod, the load imposed by the weight of the workpiece and the weight of the slide table is applied to the slide table, tending to flex the slide table to a large degree. As a result, the flatness of the slide table may be impaired, failing to position the workpiece highly accurately.

In Japanese laid-open utility model publication No. 62-185905, since the slide table functions as the cylinder body, if the displacement of the slide table is to be increased, then the piston rods have to be increased in length, and hence the slide table also has to be increased in length. As a consequence, only a limited space is available for the installation of the slide table, and the cost of the actuator is relatively high.

In the linear guide mechanism disclosed in Japanese laid-open utility model publication No. 1-63817, the ball circulation path 8 includes an arcuate portion 9 which contains a total of four joints between the retainer 6 and the end cap 4 and between the slider table 2 and the end cap 4. Because the joints are present in the arcuate portion 9, steps are liable to be produced due to different accuracies of parts when they are assembled, and if such steps are actually introduced, they present an obstacle to smooth rolling movement of the balls through the ball circulation path 8.

SUMMARY OF THE INVENTION

It is therefore an object of the present invention to provide an actuator having a slide table which has a length that can be set to a desired length irrespective of an increase in the displacement of the slide table, which is highly rigid against flexure even when the displacement of the slide table is increased, and which can be installed without undue space limitations, the actuator being manufactured relatively inexpensively.

To achieve the above object, there is provided in accordance with the present invention an actuator comprising a cylinder body having a pair of fluid inlet/outlet ports defined therein and a recess defined therein and extending in an axial direction thereof, a guide rail mounted on the cylinder body and extending in the axial direction from one end to another end of the cylinder body, a slide table mounted on the guide rail for movement along the guide rail, a piston movably disposed in the recess, a piston rod coupled to the piston for movement along the recess in response to movement of the piston, and an end plate mounted on an end of the slide table and holding a distal end of the piston rod.

The cylinder body may have a land displaced to one side thereof from a central axis thereof and extending longitudinally of the cylinder body, the land having an upper surface lying substantially flush with an upper surface of the slide table.

Only one piston may be movably disposed in the recess. Alternatively, the cylinder body may have another recess defined therein and extending in the axial direction thereof, and the actuator may further comprise another piston movably disposed in the other recess and another piston rod coupled to the other piston for movement along the other recess in response to movement of the other piston, the end plate and holding a distal end of the other piston rod.

Another object of the present invention is to provide a linear guide mechanism for allowing balls to roll smoothly in a ball circulation path in an actuator with a slide table.

To achieve the above object, there is provided in accordance with the present invention a linear guide mechanism for use in an actuator having guide rail which has a first ball rolling groove defined in a side surface thereof and a ball retainer groove defined in a bottom of the ball rolling groove, the linear guide mechanism being adapted to be mounted on a surface of the slide table which confronts the first ball rolling groove, the linear guide mechanism comprising a guide block having a second ball rolling groove composed of a first straight section adapted to confront the first ball rolling groove, a second straight section extending substantially parallel to the first straight section, and first and second arcuate sections interconnecting ends of the first and second straight sections, a first cover member having a third ball rolling groove composed of a third arcuate section confronting the first arcuate section, a straight section joined to an end of the third arcuate section and confronting the second straight section, and a ball retainer section joined to an opposite end of the third arcuate section and confronting the first straight section, a second cover member having a fourth ball rolling groove composed of a fourth arcuate section confronting the second arcuate section, a straight section joined to an end of the fourth arcuate section and confronting the second straight section, and a ball retainer section joined to an opposite end of the fourth arcuate section and confronting the first straight section, a plurality of balls inserted in the second, third, and fourth ball rolling grooves, and fastening members by which the guide block is integrally coupled to the first and second cover members, the straight sections of the first and second cover members having distal ends connected to each other, and the ball retainer sections of the first and second cover members having distal ends connected to each other.

The guide block may comprises a guide block body shaped as a rectangular parallelepiped and having the first and second straight sections, a first semicircular block body joined to one end of the guide block body and having the first arcuate section, and a second semicircular block body joined to an opposite end of the guide block body and having the second arcuate section.

In operation of the actuator, a fluid under pressure is introduced into the cylinder body through one of the fluid inlet/outlet ports. The introduced fluid under pressure presses the piston to cause the piston rod to be displaced in and along the recess. Since the distal end of the piston rod is held by the end plate mounted on the slide table, the slide table is also displaced axially of the cylinder body at the same time that the piston rod is displaced.

The slide table is guided by the guide rail mounted on the cylinder body so as to be displaced until it reaches an end of its stroke along the guide rail. When the slide table is positioned at the end of its stroke, a load is applied by the weight of a workpiece supported on the slide table and the weight of the slide table itself to the cylinder body through the guide rail.

In the linear guide mechanism, a ball circulation path has an inner peripheral surface composed only of the ball rolling groove in the guide block, and an outer peripheral surface composed only of the ball rolling groove in the first and second cover members each having straight, arcuate, and ball retainer sections. The first and second cover members are connected to each other at the straight sections and the ball retainer sections which are also straight. Since the joined ends of the first and second cover members are in the straight sections, they have a relatively high dimensional accuracy, but do not suffer accuracy differences. Therefore, any steps in the joined ends of the first and second cover members are minimum, allowing the balls to roll smoothly in the ball circulation path.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

Figure 2:
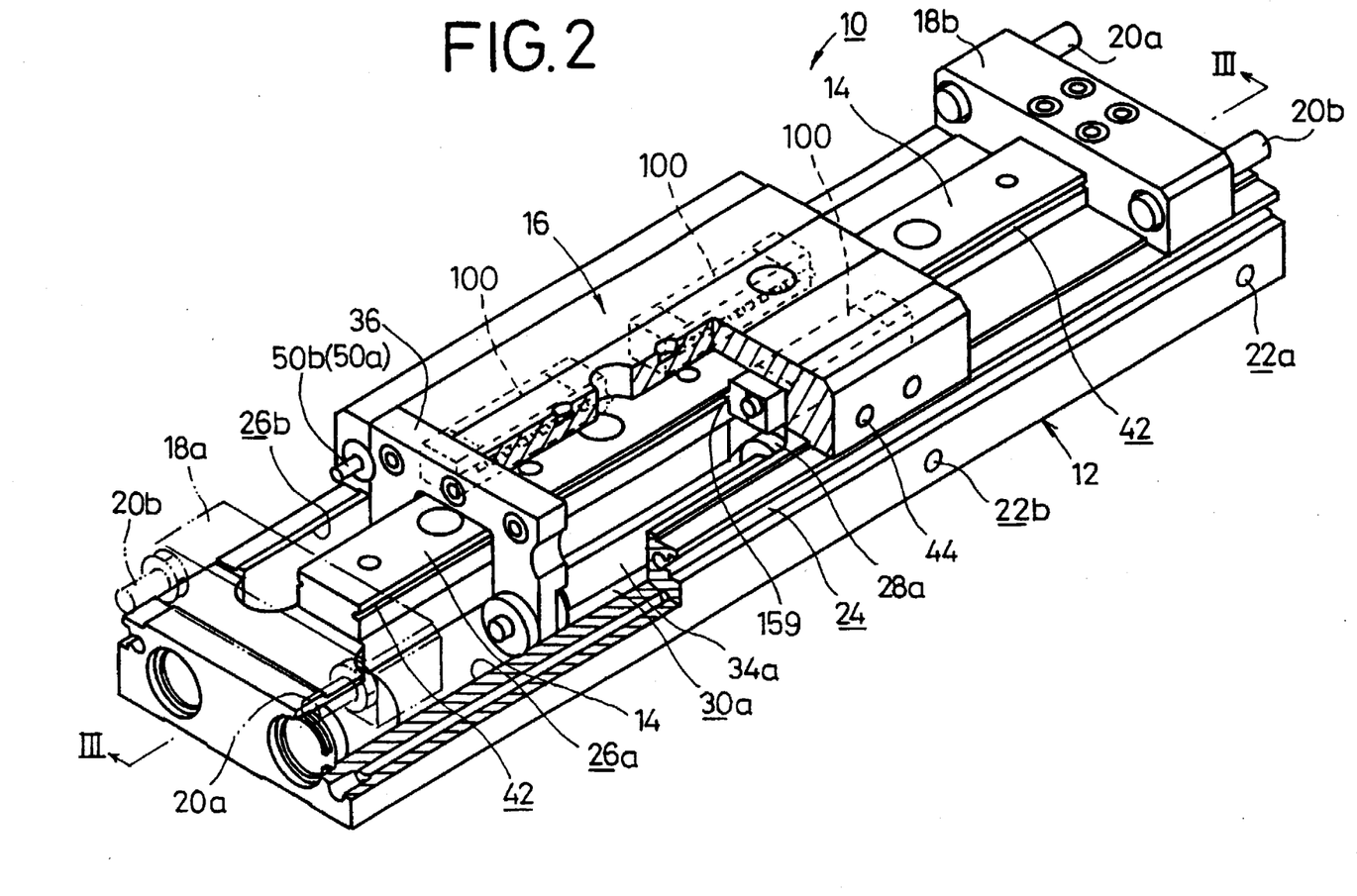
FIG. 2 is a perspective view, partly cut away, of an actuator with a slide table according to an embodiment of the present invention.

As shown in FIG. 2, an actuator 10 with a slide table according to an embodiment of the present invention basically comprises a rectangular cylinder body 12, a guide rail 14 integrally joined to an upper surface of the cylinder body 12, a slide table 16 mounted for linear reciprocating movement along the guide rail 14, and a plurality of linear guide mechanisms 100 interposed between the guide rail 14 and the slide table 16 for smoothly displacing the slide table 16 along the guide rail 14. A pair of end blocks 18a, 18b is integrally coupled to respective ends of the upper surface of the cylinder body 12. Each of the end blocks 18a, 18b has a pair of adjustment knobs 20a, 20b for fine adjustment of the displacement of the slide table 16.

The cylinder body 12 has a pair of compressed-air inlet/outlet ports 22a, 22b defined in one transverse side surface thereof, and a sensor attachment groove 24 defined therein in a longitudinal direction thereof. The cylinder body 12 also has a pair of parallel cylinder chambers 30a, 30b which are defined therein in the longitudinal direction thereof for a predetermined length. On respective extensions of the longitudinal axes of the cylinder chambers 30a, 30b, there are defined a pair of parallel recesses 26a, 26b of substantially semicircular cross section. Ring-shaped seal members 28a, 28b (see also FIG. 3) are interposed between the recesses 26a, 26b and the cylinder chambers 30a, 30b, respectively. Pistons 32a, 32b are disposed respectively in the cylinder chambers 30a, 30b for displacement in the directions indicated by the arrows X, Y. To the pistons 32a, 32b, there are connected respective piston rods 34a, 34b having distal ends coupled in the recesses 26a, 26b to an end plate 36 which is mounted on an end of the slide table 16. Each of the piston rods 34a, 34b is coupled to the end plate 36 by a pair of rings 38a, 38b fitted over the piston rod 34a, 34b and sandwiching the end plate 36 therebetween.

Ring-shaped magnets 40a, 40b are fitted in annular grooves, respectively, defined in the respective pistons 32a, 32b. The position of the pistons 32a, 32b in the cylinder chambers 30a, 30b can be detected by a sensor (not shown) which is disposed in the sensor attachment groove 24 to detect magnetic fields produced by the magnets 40a, 40b. As disclosed in Japanese laid-open utility model publication No. 62-185905, the cylinder chambers 30a, 30b are held in communication with each other by a communication passage (not shown), and compressed air supplied from one of the compressed-air inlet/outlet ports 22a, 22b, depending on the moving direction of the pistons 32a, 32b, is introduced into the cylinder chambers 30a, 30b simultaneously.

Figure 4:
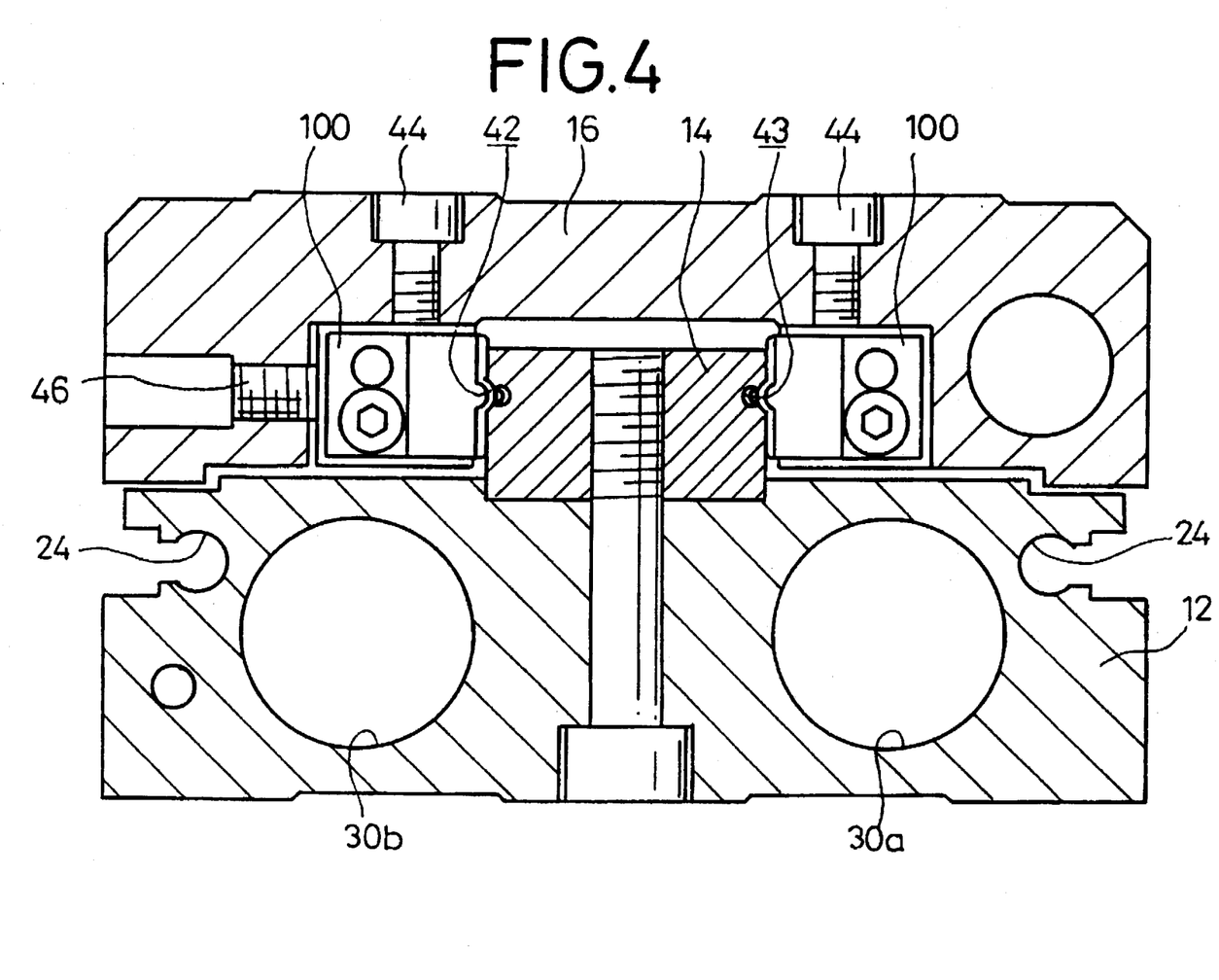
FIG. 4 is an enlarged transverse cross-sectional view of the actuator with the slide table shown in FIG. 2 at the cylinder chamber.

The guide rail 14 extends along the axis of the cylinder body 12 between the end blocks 18a, 18b. As also shown in FIG. 4, the guide rail 14 has a pair of ball rolling grooves 42 each of a substantially V-shaped cross section defined in opposite side surfaces thereof, and a pair of ball retainer grooves 43 defined respectively in the bottoms of the ball rolling grooves 42. The gaps between the guide rail 14 and the linear guide mechanisms 100 can be adjusted by screws 46 threaded in the slide table 16.

The slide table 16 is of a substantially C-shaped cross section. Four linear guide mechanisms 100 of an identical shape, two on each side of the guide rail 14, are mounted in the slide table 16 by bolts 44 (see FIG. 4) which are threaded into the slide table 16 on opposite sides of the guide rail 14. A pair of spaced shock absorbers 50a, 50b is mounted on each of axially opposite ends of the slide table 16, for dampening shocks produced when the slide table 16 hits one of the end blocks 18a, 18b at an end of the stroke of the slide table 16 on the cylinder body 12. It is preferable that the slide table 16 and the end plate 36 be integrally formed with each other.

Figure 5:
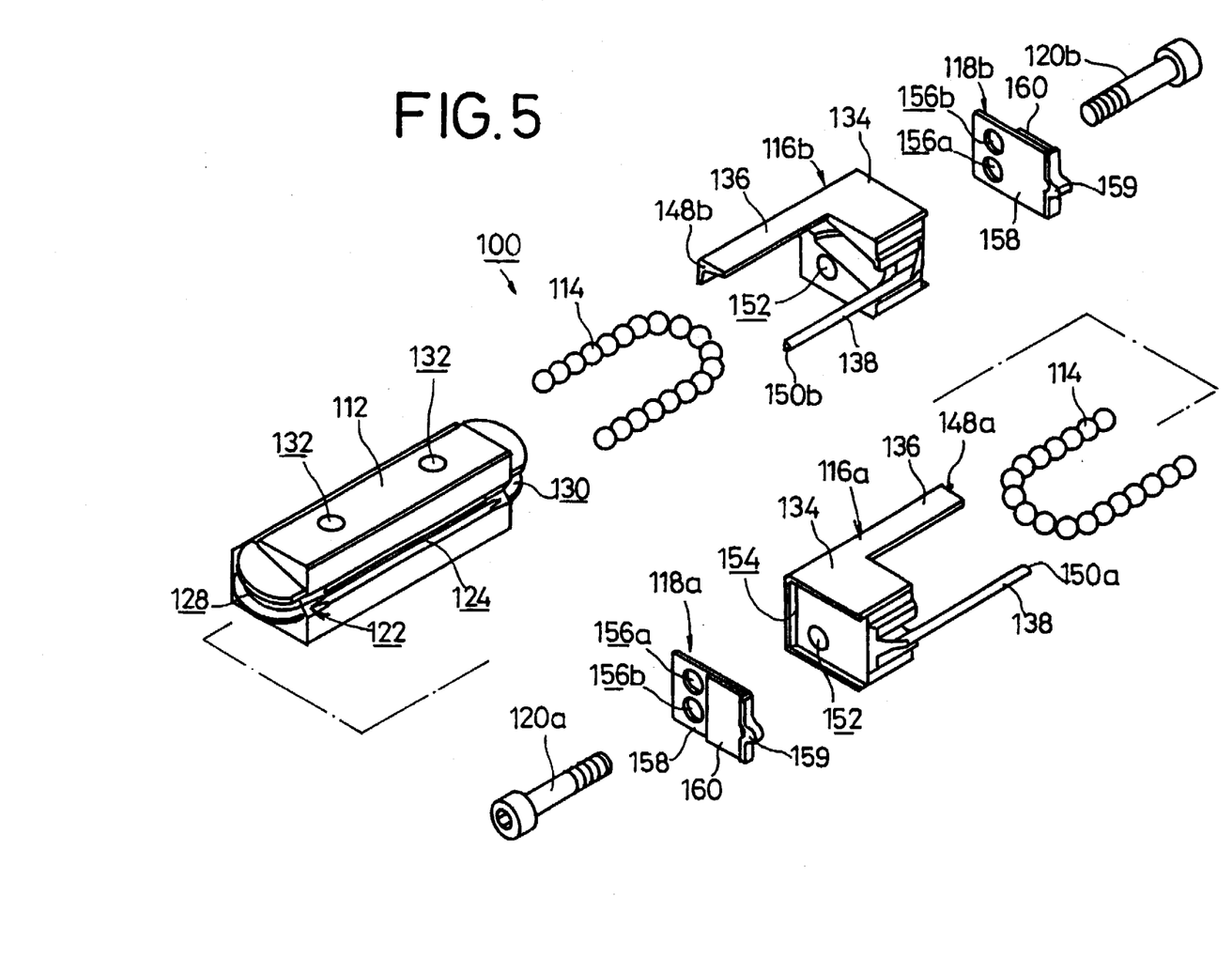
FIG. 5 is an exploded perspective view of a linear guide mechanism of the actuator with the slide table shown in FIG. 2.

As shown in FIG. 5, each of the linear guide mechanisms 100 generally comprises a guide block 112, a plurality of balls 114, a pair of cover members 116a, 116b, a pair of scrapers 118a, 118b, and a pair of bolts 120a, 120b.

The guide block 112, which is of a rectangular shape, has a ball rolling groove 122 defined in and around peripheral side surfaces of the rectangular guide block 112. The ball rolling groove 122 comprises first and second straight sections 124, 126 (see also FIG. 6) defined in opposite longitudinal side surfaces, respectively, of the guide block 112, and first and second arcuate sections 128, 130 transversely interconnecting the ends of the first and second straight sections 124, 126 at opposite longitudinal ends of the slide block 16. The guide block 112 has threaded holes 132, 133 (see FIGS. 5 and 7) defined in upper and transverse side surfaces thereof for insertion of bolts.

Figure 6:
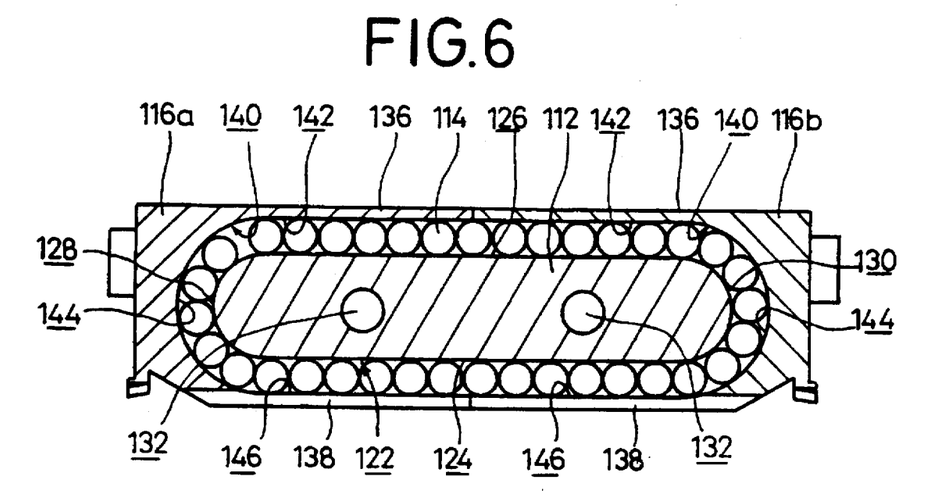
FIG. 6 is a horizontal cross-sectional view of the linear guide mechanism shown in FIG. 5.

Each of the cover members 116a, 116b has a substantially rectangular body 134, a cover 136 of a substantially L-shaped cross section, and a retainer 138, the cover 136 and the retainer 138 projecting integrally from the body 134. The body 134, the cover 136, and the retainer 138 have a ball rolling groove 140 defined in their surfaces which confront the ball rolling groove 122 in the guide block 112. As shown in FIG. 6, the ball rolling groove 140 is composed of a straight section 142 confronting the second straight section 126 of the ball rolling groove 122 in the guide block 112, a pair of arcuate sections 144 confronting the first and second arcuate sections 128, 130, respectively, of the ball rolling groove 122, and a ball retainer section 146 confronting the first straight section 124 of the ball rolling groove 122.

The cover 136 and the retainer 138 of the cover member 116a have teeth 148a, 150a, respectively, disposed on their distal ends. The cover 136 and the retainer 138 of the cover member 116b have recesses 148b, 150b, respectively, defined in their distal ends. The body 134 has a hole 152 defined therein in alignment with the threaded hole 133 in the guide block 112, and a recess 154 defined therein for retaining a scraper.

Each of the scrapers 118a, 118b has a plate 158 having a pair of holes 156a, 156b defined therein, either one of which may be held in alignment with the hole 152 in one of the cover members 116a, 116b, and a seal 160 mounted on the plate 158 and having a projection 159 complementary in shape to the cross section of one of the ball rolling grooves 42 in the guide rail 14.

Each of the linear guide mechanisms 100 is assembled as follows: The balls 114 are inserted into the ball rolling grooves 122 in the guide block 112, and the cover members 116a, 116b are installed on the guide block 112 from its opposite ends. At this time, the teeth 148a, 150a on the distal ends of the cover 136 and the retainer 138 of the cover member 116a are fitted respectively into the recesses 148b, 150b in the distal ends of the cover 136 and the holder 138 of the cover member 116b, thereby joining the cover members 116a, 116b to each other. The scrapers 118a, 118b are then fitted respectively into the recesses 154 in the cover members 116a, 116b. Thereafter, the bolt 120a is inserted through the hole 156b in the scraper 118a and the hole 152 in the cover member 116a and threaded into the threaded hole 133 in the guide block 112, thus fastening the scraper 118a, the cover member 116a, and the guide block 112 securely to each other. Similarly, the scraper 118a, the cover member 116a, and the guide block 112 are fastened securely to each other by the bolt 120b.

Figure 7:
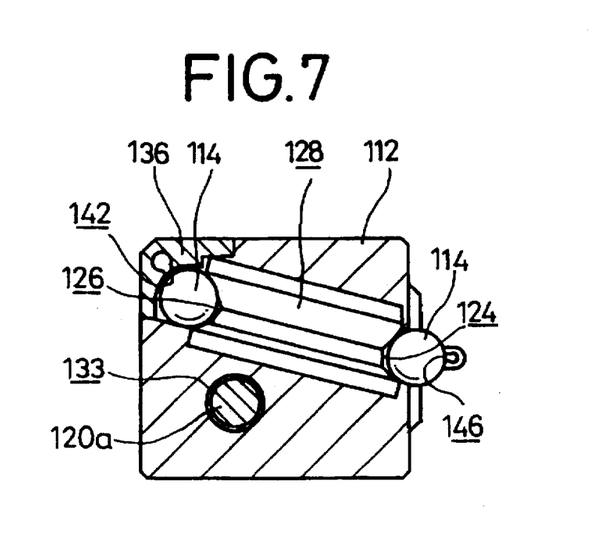
FIG. 7 is a transverse cross-sectional view of the linear guide mechanism shown in FIG. 5.

Therefore, as shown in FIGS. 6 and 7, the second straight section 126 of the ball rolling groove 122 in the guide block 112 is covered by the covers 136 of the cover members 116a, 116b. The ball rolling grooves 122, 140 jointly make up a ball circulation path.

Figure 3:
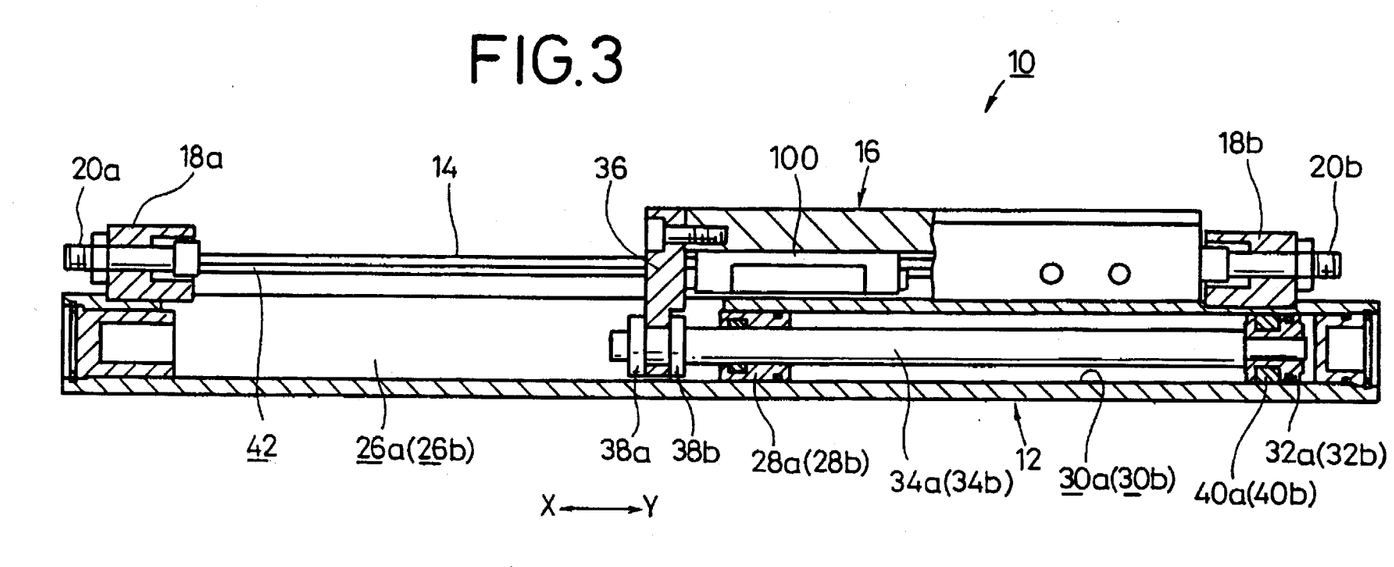
FIG. 3 is a longitudinal cross-sectional view taken along line III—III of FIG. 2.

The actuator 10 with the slide table 16 operates and offers advantages as follows:

When compressed air is supplied through the compressed-air inlet/outlet port 22a, the pistons 32a, 32b are displaced in the cylinder chambers 30a, 30b in the direction indicated by the arrow X (FIG. 3). The piston rods 34a, 34b and the end plate 36 are also moved, thereby displacing the slide table 16 in the same direction X. At this time, the slide table 16 is smoothly displaced by the four linear guide mechanisms 100, positioned two on each side of the guide rail 14.

Specifically, the balls 114 which are positioned in the first straight sections 124 of the ball rolling grooves 122 of the linear guide mechanisms 100 roll in the ball rolling grooves 42 in the guide rail 14, allowing the slide table 16 to be smoothly displaced. The retainers 138 of the cover members 116a, 116b of the linear guide mechanisms 100 are displaced in the ball retainer grooves 43 out of contact with the surfaces which define the ball retainer grooves 43. The projections 159 of the seals 160 of the scrapers 118a, 118b engage in the ball retainer grooves 42 in the guide rail 14, preventing dust particles from entering the linear guide mechanisms 100.

When compressed air is supplied through the other compressed-air inlet/outlet port 22b, the pistons 32a, 32b are displaced in the cylinder chambers 30a, 30b in the direction indicated by the arrow Y, thus displacing the slide table 16 in the direction Y.

The slide table 16 is always supported on the guide rail 14 no matter where the slide table 16 is positioned, e.g., even when the slide table 14 is positioned at one of the ends of its stroke. Therefore, the weight of a workpiece placed on the slide table 16 and the weight of the slide table 16 itself are borne directly by the cylinder body 12 through the guide rail 14. As a consequence, the slide table 16 is prevented from being flexed under high loads, and hence is highly rigid against flexure.

The distal ends of the piston rods 34a, 34b are held by the end plate 36 which is integrally coupled to the slide table 16, for transmitting any displacement of the piston rods 34a, 34b to the slide table 16. Consequently, the displacement of the slide table 16 is limited by the pistons 32a, 32b, and can be set to a desired displacement irrespective of the length of the slide table 16. Even if the cylinder body 12 is extended in its axial direction to increase the displacement of the slide table 16, the length of the slide table 16 can be set to a desired length.

Since the displacement of the slide table 16 can be set to a desired displacement irrespective of the length of the slide table 16, the slide table 16 itself and the cylinder body 12 can be made compact in size even if the displacement of the slide table 16 is increased. As a result, the actuator 10 with the slide table 16 can be manufactured relatively inexpensively, installed without undue space limitations, highly rigid, and reduced in size and weight for use in a wide range of applications.

Each of the linear guide mechanisms 100 has few joints as the ball rolling grooves 122, 140 are defined by the guide block 112 and the cover members 116a, 116b. The arcuate sections of the ball rolling grooves 122, 140 are free of undesirable steps because the arcuate and straight sections of the ball rolling grooves 122, 140 are integrally joined to and smoothly blend into each other in the guide block 112 and the cover members 116a, 116b. The cover members 116a, 116b are reliably and securely joined to each other by the teeth 148a, 150a of the cover member 116a which are fitted respectively into the recesses 148b, 150b in the cover member 116b. Since the joined ends of the cover members 116a, 116b are on the straight sections of the ball rolling grooves 122, 140, they have a relatively high dimensional accuracy, but do not suffer accuracy differences. Therefore, any steps in the joined ends of the cover members 116a, 116b are minimum, allowing the balls 114 to roll smoothly in the ball rolling grooves 122, 140.

Figure 8:
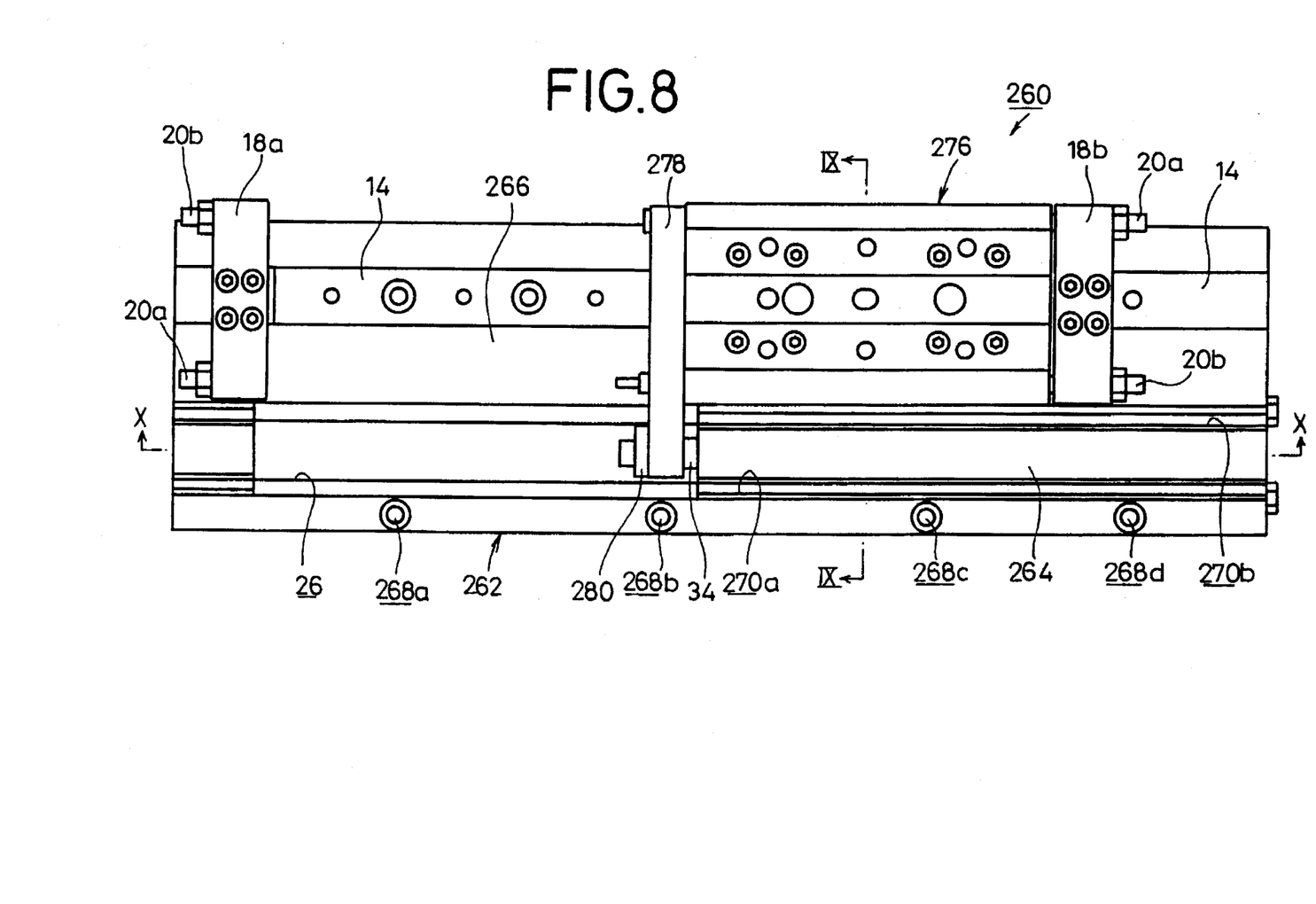
FIG. 8 is a plan view of an actuator with a slide table according to another embodiment of the present invention.
Figure 9:
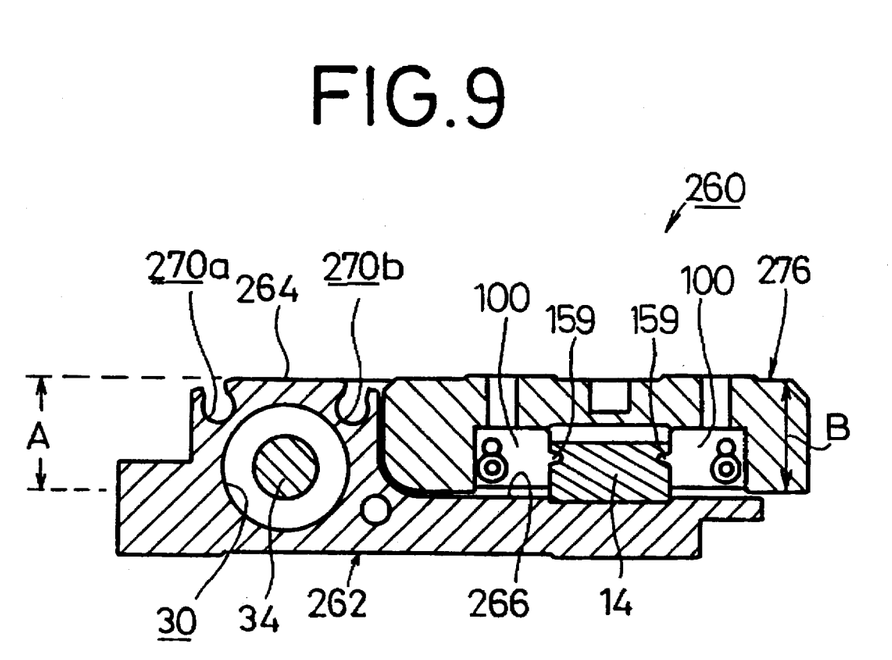
FIG. 9 is a transverse cross-sectional view taken along line IX—IX of FIG. 8.
Figure 10:
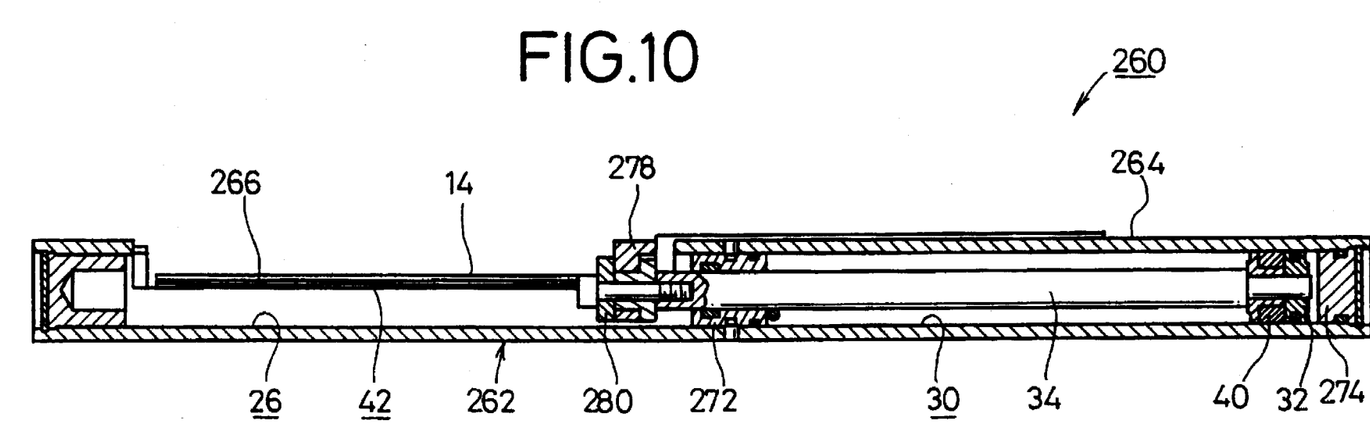
FIG. 10 is a longitudinal cross-sectional view taken along line X—X of FIG. 8.

An actuator 260 with a slide table according to another embodiment of the present invention is shown in FIGS. 8 through 10. The actuator 260 operates in the same manner as the actuator 10 shown in FIG. 2, and hence operation of the actuator 260 will not be described below. Those parts shown in FIGS. 8 through 10 which are identical to those shown in FIGS. 2 through 7 are denoted by identical reference numerals, and will not be described in detail below. Only structural details of the actuator 260 which differ from those of the actuator 10 will be described below.

The actuator 260 has a cylinder body 262 which is composed of a land 264 displaced to one side from a central axis of the cylinder body 262 and extending longitudinally from a substantially central region of the cylinder body 262 to one end thereof, and a wide flat portion 266 integrally formed with and disposed adjacent to the land 264 (see FIG. 9). The land 264 has a pair of spaced slots 270a, 270b (see FIGS. 8 and 9) defined in an upper surface thereof for attachment of a sensor (not shown).

The land 264 also has a cylinder chamber 30 of a substantially circular cross section which is defined therein and houses a piston 32. The cylinder chamber 30 is hermetically sealed by a pair of seals 272, 274 (see FIG. 10) positioned respectively in opposite ends thereof. A ring-shaped magnet 40 is fitted over the piston 32.

A guide rail 14 is mounted on an upper surface of the flat portion 266, and a slide table 276 is displaceably mounted on the guide rail 14 with linear guide mechanisms 100 movably interposed therebetween. An end plate 278 is mounted on a longitudinal end of the slide table 274, and coupled by a holder 280 to a distal end of a piston rod 34 which is connected to the piston 32 and projects out of the cylinder chamber 30 (see FIG. 8).

In the actuator 10 shown in FIG. 2, the two pistons 32a, 32b are disposed in respective opposite sides of the cylinder body 12. In the actuator 260, however, only one piston 32 is disposed in one side of the cylinder body 262. As shown in FIGS. 8 and 10, the cylinder body 262 has one recess 26 of a substantially semicircular cross section defined therein on an extension of the axis of the cylinder chamber 30.

As shown in FIG. 9, the height A from the upper surface of the flat portion 266 to the upper surface of the land 264 is substantially the same as the thickness B of the slide table 276. Therefore, the upper surface of the land 264 lies substantially flush with the upper surface of the slide table 276. Since the upper surface of the slide table 276 does not project upwardly from the upper surface of the cylinder body 262, any space above the actuator 260 is available for other use, and the actuator 260 is compact in shape, small in size, and low in weight.

Figure 11:
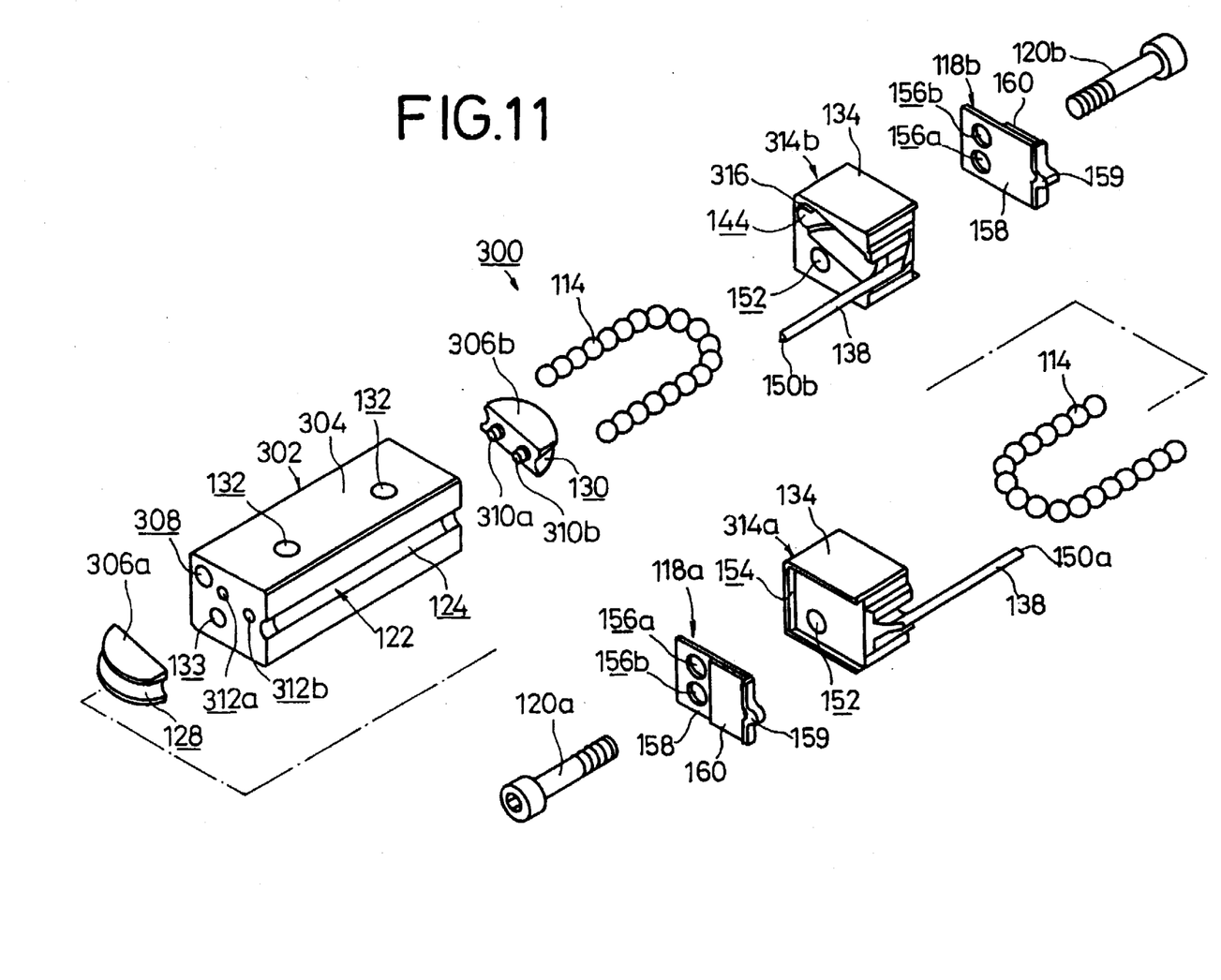
FIG. 11 is an exploded perspective view of a linear guide mechanism according to another embodiment of the present invention.
Figure 12:
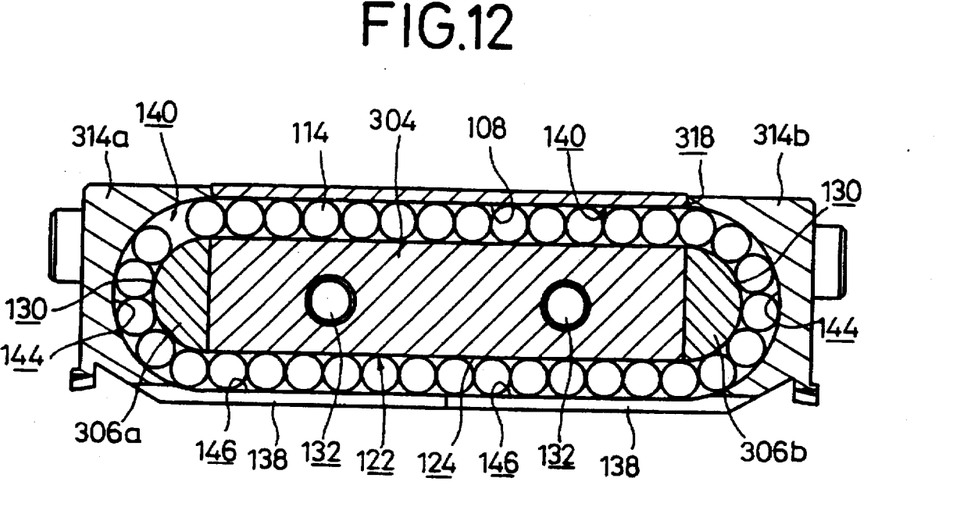
FIG. 12 is a horizontal cross-sectional view of the linear guide mechanism shown in FIG. 11.
Figure 13:
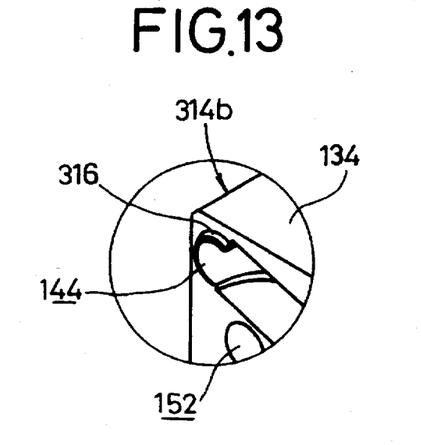
FIG. 13 is an enlarged fragmentary perspective view of the linear guide mechanism shown in FIG. 11.

A linear guide mechanism 300 according to another embodiment of the present invention is shown in FIGS. 11 through 13. Those parts shown in FIGS. 11 through 13 which are identical to those shown in FIGS. 5 through 7 are denoted by identical reference numerals, and will not be described in detail below. The linear guide mechanism 300 shown in FIGS. 11 through 13 operates in the same manner as the linear guide mechanism 100 shown in FIGS. 5 through 7, and hence operation of the linear guide mechanism 300 will not be described below.

The linear guide mechanism 300 has a guide block 302 composed of a guide block body 304 in the shape of a rectangular parallelepiped and a pair of semicircular block bodies 306a, 306b coupled to the guide block body 304.

The guide block 302 has a ball rolling groove 122 defined in and around peripheral side surfaces thereof. The ball rolling groove 122 comprises a first straight section 124 defined in a longitudinal side surface of the guide block body 304, a second straight section 126 defined as a through hole 308 in the guide block body 304, a first arcuate section 128 defined in the semicircular block body 306a, and a second arcuate section 130 defined in the semicircular block body 306b. The semicircular block body 306a has a pair of pins 310a, 310b projecting from a flat surface thereof and joined to a longitudinal end of the guide block body 304. The semicircular block body 306b also has a pair of pins 310a, 310b projecting from a flat surface thereof and joined to an opposite longitudinal end of the guide block body 304. Specifically, these pins 310a, 310b of the semicircular block bodies 306a, 306b are fitted into respective holes 312a, 312b defined in the longitudinal ends of the guide block body 304, thus joining the semicircular block bodies 306a, 306b to the guide block body 304. When the semicircular block bodies 306a, 306b are joined to the guide block body 304, the first straight section 124, the second straight section 126, and the first and second arcuate sections 128, 130 jointly make up the ball rolling groove 122.

Since the guide block 302 is composed of the guide block body 304 and the semicircular block bodies 306a, 306b which are separate from each other, the guide block 302 can be manufactured relatively simply.

The cover members 314a, 314b have no projecting covers for covering a straight section of the ball rolling groove 122 because the second straight section 126 is defined as the through hole 308 in the guide block body 304. The body 134 of each of the cover members 314a, 314b has a semicircular ridge 316 (see FIG. 13) projecting outwardly from an end of the arcuate section 144, and the guide block 302 has a groove 318 (see FIG. 12) defined in the end of the through hole 308 at each of the longitudinal ends of the guide block body 304 for receiving the semicircular ridge 316 therein. When the semicircular ridges 316 of the cover members 314a, 314b are fitted respectively into the grooves 318 in the guide block body 304, the through hole 308, which serves as the second straight section 142, is joined to the arcuate sections 144 in the cover members 314a, 314b without undue steps therebetween.

The actuator with the slide table according to the embodiments of the present invention offers the following advantages:

Even when the slide table is positioned at either one of the stroke ends, since the slide table is always supported on the guide rail, the slide table is prevented from being flexed and hence is highly rigid.

The distal ends of the piston rods are held by the end plate on the slide table for transmitting a displacement of the piston rods to the slide table. Therefore, the displacement of the slide table is limited by the displacement of the piston rods, and can be set to a desired displacement regardless of the length of the slide table. As a result, even if the cylinder body is extended in its axial direction to increase the displacement of the slide table, the length of the slide table can be set to a desired length.

Since the displacement of the slide table can be set to a desired displacement irrespective of the length of the slide table, the slide table itself and the cylinder body can be made compact in size even if the displacement of the slide table is increased. Consequently, the actuator with the slide table can be manufactured relatively inexpensively, installed without undue space limitations, highly rigid, and reduced in size and weight for use in a wide range of applications.

The linear guide mechanism according to the present invention offers the following advantages:

The ball circulation path has an inner peripheral surface composed only of the ball rolling groove in the guide block, and an outer peripheral surface composed only of the ball rolling groove in the first and second cover members each having straight, arcuate, and ball retainer sections. The first and second cover members are connected to each other at the straight sections and the ball retainer sections which are also straight. Since the joined ends of the first and second cover members are in the straight sections, they have a relatively high dimensional accuracy, but do not suffer accuracy differences. Therefore, any steps in the joined ends of the first and second cover members are minimum, allowing the balls to roll smoothly in the ball circulation path.

Although certain preferred embodiments of the present invention has been shown and described in detail, it should be understood that various changes and modifications may be made therein without departing from the scope of the appended claims.

What is claimed is:

1. A monorail actuator comprising:

a cylinder body having a cylinder chamber defined therein in an axial direction of the cylinder body for a predetermined length less than the full length of said cylinder body, said cylinder body further having a recess defined therein extending from the cylinder chamber substantially along a same common axis as said cylinder chamber;

a single guide rail mounted on said cylinder body and extending in the axial direction alongside both said cylinder chamber and said recess from one end to another end of the cylinder body, wherein said guide rail has at least one ball rolling groove defined therein, and wherein said cylinder chamber and said recess are disposed along said same axis thereof to one side of a vertical plane which bisects said guide rail in a longitudinal direction of said guide rail;

a slide table mounted on top of said guide rail for movement along the guide rail;

a plurality of balls disposed in said at least one ball rolling groove between said table and said guide rail;

a piston movably disposed in said cylinder chamber;

a piston rod coupled to said piston for movement along said recess in response to movement of said piston; and an end plate mounted on an end of said slide table, said end plate being coupled to a distal end of said piston rod, said end plate having a portion movably disposed within said recess.

2. A monorail actuator according to claim 1, wherein said cylinder body has a land displaced to one side thereof from a central axis thereof and extending longitudinally of the cylinder body, said land having an upper surface lying substantially flush with an upper surface of said slide table.

3. A monorail actuator according to claim 2, wherein only one piston is movably disposed in said cylinder body.

4. A monorail according to claim 1, wherein said cylinder body has another set of a cylinder chamber, a recess, a piston and a piston rod, a distal end of said other piston rod being held by said end plate.

5. A monorail according to claim 1, further comprising at least one linear guide mechanism mounted between said slide table and said guide rail, wherein said at least one ball rolling groove comprises a first ball rolling groove defined in a surface of said guide rail and comprising a second ball rolling groove defined in said linear guide mechanism, said plurality of balls being mutually disposed in said first and second ball rolling grooves.

6. A monorail according to claim 5, wherein said linear guide mechanism further comprises:

a guide block, said second ball rolling groove being defined in said guide block and comprising a first straight section confronting said first ball rolling grove, a second straight section extending substantially parallel to said first straight section, and first and second arcuate sections interconnecting ends of said first and second straight sections;

a first cover member having a third ball rolling groove composed of a third arcuate section confronting said first arcuate section, a straight section joined to an end of said third arcuate section and confronting said second straight section, and a ball retainer section joined to an opposite end of said third arcuate section and confronting said first straight section;

a second cover member having a fourth ball rolling groove composed of a fourth arcuate section confronting said second arcuate section, a straight section joined to an end of said fourth arcuate section and confronting said second straight section, and a ball retainer section joined to an opposite end of said fourth arcuate section and confronting said first straight section;

a plurality of fastening members by which said guide block is integrally coupled to said first and second cover members;

wherein said straight sections of said first and second cover members have distal ends connected to each other, and said ball retainer sections of said first and second cover members have distal ends connected to each other; and wherein said plurality of balls are retained in a ball path composed of said second, third, and fourth ball rolling grooves.

7. A monorail according to claim 6, wherein said guide block further comprises:

a guide block body shaped as a rectangular parallelepiped and having said first and second straight sections defined therein;

a first semicircular block body joined to one end of said guide block body and having said first arcuate section defined therein; and a second semicircular block body joined to an opposite end of said guide block body and having said second arcuate section defined therein.

* * * * *